US005195180A

United States Patent [19]

Takakura et al.

[11] Patent Number: 5,195,180

[45] Date of Patent: Mar. 16, 1993

[54] METHOD FOR DISPLAYING AN IMAGE INCLUDING CHARACTERS AND A BACKGROUND

[75] Inventors: Masaki Takakura, Higashiosaka; Yasukuni Yamane; Noritoshi Kako, both of Nara, all of Japan

[73] Assignee: Sharp Kabushiki Kaisha, Osaka, Japan

[21] Appl. No.: 369,125

[22] Filed: Jun. 21, 1989

[30] Foreign Application Priority Data

Jun. 23, 1988 [JP] Japan ............................... 63-157538

[51] Int. Cl.[5] ............................................ G06F 15/20

[52] U.S. Cl. ................................... 395/164; 395/162; 395/143; 340/703; 340/750

[58] Field of Search ........ 364/518, 521, 200 MS File, 364/900 MS File; 340/747, 750, 703, 730; 395/141, 142, 143, 162, 164

[56] References Cited

U.S. PATENT DOCUMENTS

| | | | |
|---|---|---|---|
| 4,475,124 | 10/1984 | Ankeny et al. | 358/183 |
| 4,593,372 | 6/1986 | Bandai et al. | 364/719 |
| 4,641,263 | 2/1987 | Perlman et al. | 364/900 |
| 4,698,666 | 10/1987 | Lake, Jr. et al. | 358/22 |
| 4,924,414 | 5/1990 | Ueda | 364/522 |

*Primary Examiner*—Gary V. Harkcom

*Assistant Examiner*—Phu K. Nguyen

[57] ABSTRACT

In a method for displaying an image, the image is divided into a first image area which includes characters, the border of which is overlapping a part of a color background, and a second image area which includes the other part of the background. The method includes the steps of setting data of pixels of the image using n bits in a multi-purpose area of an image memory, in a manner that, in setting data of pixels in the first image area, some of the n bits are used for color information of the background present at the border of the characters and the others are used for data of the characters. Further, in setting data for pixels in the second image area, all of the n bits are used for color information of the background, except that of the part underlying the border of the characters. The method further includes the steps of setting a flag in another area of the image memory, the flag indicating to which of the first and second image area each of the pixels of the image belongs; synthesizing color information of the background and that of the characters based on the image data and the flag stored in the image memory so that colors of the characters at the border thereof are mixed with colors of the background so as to have neutral tints; and displaying the image, obtained through the synthesis, on a display unit.

13 Claims, 3 Drawing Sheets

*Fig. 1*
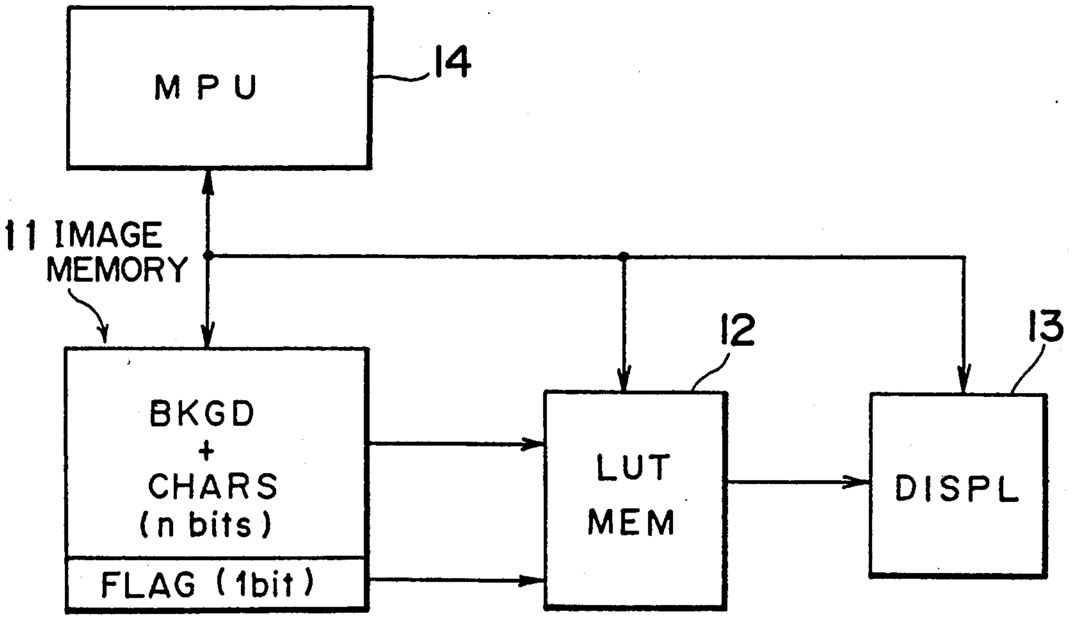
*Fig. 2(a)*
*Fig. 2(b)*
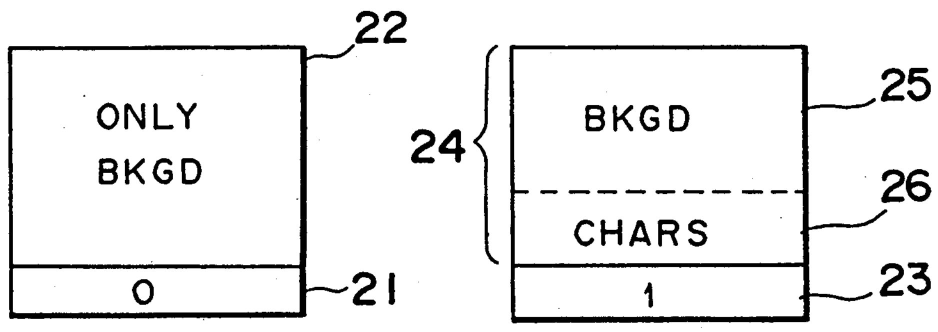

METHOD FOR DISPLAYING AN IMAGE INCLUDING CHARACTERS AND A BACKGROUND

BACKGROUND OF THE INVENTION

1. Field of the Invention

The present invention relates to a method for displaying images, including characters and color backgrounds based on image data stored in an image memory of an image processing device 2. Description of the Prior Art A display method called a bit map method is often applied to an image processing device which is designed to make an arbitrary layout of characters on a display unit possible. This method stores character patterns in a memory, regards character patterns as images, and displays the character patterns based on the data stored in the memory. Therefore, by this method, sizes and display positions of the characters can be changed as required during the procedure of storing the data of the character patterns.

Character patterns obtained by the bit map method can be synthesized with a color background, like a picture, and displayed as an image using one of the following two methods.

(i) Store the character data and color background data separately, and synthesize both types of data.

(ii) Develop the character data and the background data in one memory and output the data as a piece of an image.

Because the method (i) requires a memory for storing the character data, besides a memory for storing the color background data, the method (i) requires larger memory capacity than the method (ii) does. However, because the character data can be processed irrespective of the background data, processings including that of changing only the color of the characters are readily done even after synthesis of the character patterns has been completed. A conventional image processing device adopting this method (i) is shown in FIG. 3.

The device shown in FIG. 3 is comprised of an image memory 1 which includes a first memory area for storing n-bit data of color backgrounds and a second memory area for storing one-bit data of characters; a synthesizer 2 for synthesizing the data of the color background and the data of the characters supplied by the image memory 1; a display unit 3 and a micro processing unit 4 for controlling the above units, setting the image memory 1, etc.

Further, in the case where a number of complicated characters, such as Chinese characters, are required to be displayed on a display unit which has poor image to pixel decomposition few pixels are allocated to each character. Therefore, characters displayed on such a display unit only using black and white, as in the case of FIG. 3, are illegible.

A method expressing characters as images having different levels of gray has been proposed to solve the above mentioned problem. This method will now be described by taking a line pattern as an example as shown by FIGS. 4(*a*) and 4(*b*). In FIG. 4(*a*), each pixel of a line pattern is expressed using either black or white, and in FIG. 4(*b*), colors having different gray levels are allotted to pixels of the line pattern. When compared with the image of FIG. 4(*a*) which has remarkable indentations, the image of FIG. 4(*b*) has a much better quality, having no indentations.

This method, however, needs much a larger data quantity. For example, when the gray scale includes eight levels, three bits are needed to represent each dot of a character, which is three times as large as that required in the case of a binary image. Furthermore, if such character information having several gray levels, is stored separately from the color background information in accordance with the aforementioned method (i), memory capacity must be large. For example, assuming that k bits are used to represent each pixel of the characters, memory capacity is increased as shown in FIG. 5.

SUMMARY OF THE INVENTION

It is, therefore, an object of the present invention to provide a method by which a good quality display of characters is obtained even in a display device having poor image to pixel decomposition, without requiring a large memory capacity.

In order to accomplish the above object, a first feature of the present invention is storage of the following three kinds of information in an image memory.

(a) Information on color backgrounds;

(b) Information on characters; and (c) Flag for discriminating characters from a background.

A second feature of the present invention is that of storage of both kinds of information, (a) and (b), in a common memory area of an image memory.

A third feature of the present invention is that the value of the flag determines whether the common memory area is storing only the color background image information or both color background image information and character image information.

In summary, in a method for displaying an image, wherein the image is divided into a first image area which includes characters, the border of which is overlapping a part of a color background, and a second image area which includes the other part of the background, by the use of an image processing device which has data setting means for setting image data on the characters and the color background; an image memory for storing the image data set by the setting means; synthesizing means for synthesizing the image data on the characters and background; and a display unit for displaying the characters along with the color background image. The method of the present invention includes the steps of (i) setting data of pixels of the image using a predetermined fixed number of bits in a first memory area of the image memory in a manner such that: (a) in setting data of the pixels in the first image area, some of the fixed number of bits are used to represent color information of the background present at the border of the characters and the others are used to represent data of the characters; and (b) in setting data for the pixels in the second image area, all of the fixed number of bits are used to represent color information of the background except that of the part underlying the border of the characters. The method further includes the steps of (ii) setting a flag in a second memory area of the image memory, the flag indicating which of the first and second image area that each of the pixels of the image belongs to; (iii) synthesizing color information of the background and that of the characters, based on the data stored in the first memory area and the flag stored in the second memory area, so that colors of the characters at the border thereof are mixed with colors of the background so as to have neutral tints; and (iv) displaying the image obtained through the synthesis on the display unit.

Preferably, the bits used for representing color data of the background in the first image area are upper bits and the other bits for representing data of the characters are lower bits.

Preferably, the synthesizing means are constructed of a look-up table memory and output data from the image memory are provided to the look-up table memory as addresses.

Furthermore, preferably, the data of the characters indicate gray levels of the pixels constructing the characters, and colors of the characters and background are mixed at ratios decided on the basis of the gray levels of the pixels present in the first image area.

According to the above construction of the present invention, the color information of a background image shares the first memory area of the image memory with information on characters, and the flag is constructed of only one bit. Therefore, memory capacity of the image memory is similar to that of the conventional system of FIG. 3. In spite of such a small memory capacity, a good quality character image is obtained, wherein colors of characters are mixed with colors of a color background image at its border, in accordance with the gray levels of the pixels present there. There is no comparison between character images obtained by the system of the present invention and the conventional system of FIG. 3. In a word, according to the present invention, with the same memory capacity as that of the conventional system of FIG. (3), characters of much a better quality are displayed

BRIEF DESCRIPTION OF THE DRAWINGS

These and other objects and features of the present invention will become readily apparent from the following description taken in conjunction with the preferred embodiments thereof with reference to the accompanying drawings, in which:

FIG. 1 is a block diagram of an image processing device for applying the present invention is applied;

FIGS. 2(*a*) and (*b*) are explanatory views showing the contents of the image memory;

DETAILED DESCRIPTION OF THE INVENTION

Figure 3:
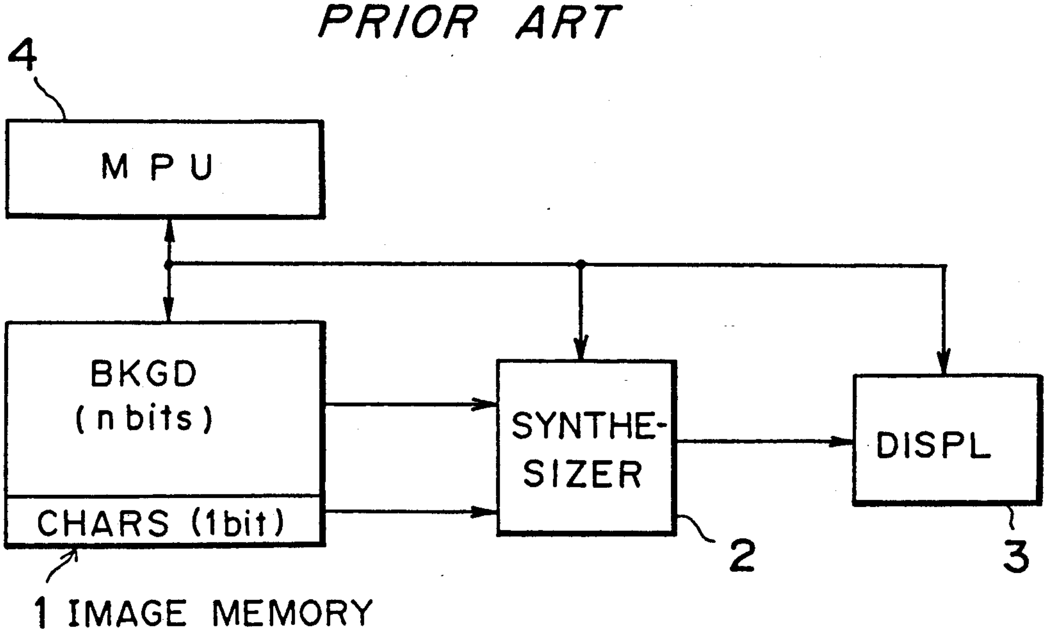
Fig. 3 PRIOR ART
FIGS. 3 and 5 are diagrams of different conventional systems.

FIG. 1 shows an image processing device for applying the present invention. In FIG. 1, 11 is an image memory which includes a first or multi-purpose memory area of n bits and a second memory area of one bit. The n-bit memory area stores color information of pixels of a background image and information on gray levels of pixels of characters. The other memory area of one bit stores a flag for indicating whether data of characters are stored in the multi-purpose memory area or not. Numeral 12 is a look-up table memory, acting as a synthesizing device which receives output data from the image memory 11 as addresses and then outputs data obtained by a conversion table which has been set in such a manner as will be described later. Numeral 13 is a display unit such as a CRT which displays images in response to input signals from the look-up table memory 12. Finally, 14 is a microprocessing unit, acting as a data setting device which controls the image memory 11, look-up table memory 12 and display unit 13, in addition to setting the contents of the image memory 11.

The following describes how the discrimination flag is set in the image memory 11. An image including characters can be divided into three parts: a background part having only information of a background, a character part having only information of characters, and another character part having mixed information of the background and the characters. The flag is set to zero for the background part, and to one for the other two parts.

The image memory 11 is set in the following manner. First, when the discrimination flag is set to zero, that is, when image information includes only background information, the n bits of the multi-purpose memory area are all used for the color background information, for no characters exist in that part. On the other hand, when the discrimination flag is set to one, that is, when image information includes character information, some of the n bits are used for the color background information and the other bits are used for the character information.

A more detailed description is given hereinafter by way of example.

In this example, the multi-purpose memory area of the image memory 11 stores triplets Cr, Cg and Cb which are values of three primary colors red (r), green (g) and blue (b) as the color background information, and also stores a gray level k as the character information. The discrimination flag is represented by a zero or a one. The color background information Ci (i=r,g,b) is constructed of seven bits, assuming values between zero and $2^7-1$. The gray level information k is constructed of three bits, assuming values between zero and $2^3-1$. Under the above mentioned condition, data of the image memory 11 has a value Xi which is set as follows. The equation (1) is for the background part and the equation (2) is for the other parts including characters.

$$Xi=(Ci)\times 2+0 \quad (1)$$

$$Xi=\{Ci\&(2^7-2^3)+k\}\times 2+1 \quad (2)$$

FIG. 2(*a*) shows the content of the memory 11 corresponding to the equation (1), wherein the discrimination flag 21 is zero and all the bits of the multi-purpose memory area 22 are used for the color information of the background. FIG. 2(*b*) shows the content of the memory 11 corresponding to the equation (2). In this case, the flag 23 assumes the value 1, the upper four bits of the multi-purpose memory area 24 contain the color background information 25 and lower three bits contain the character information 26.

The look-up table memory 12 works as follows. The look-up table memory 12 stores a conversion table which is set in such a manner that input Xi and output Yi (i=r, g, b) have a predetermined relationship as described below. When the look-up table memory 12 receives input data Xi at its address terminals, output data Yi are provided at its output. The input data Xi are comprised of contents of the multi-purpose memory area and the discrimination flag as aforementioned.

The conversion table in the look-up table memory 12 is set so as to obtain the following relationship between the input Xi and output Yi.

Assuming that $f=Xi\&1$, and $Mi=int(Xi/2)$ ("int" here indicates a function for carrying out the truncation of a fractional part), if $f=0$, that is, if the value of the discrimination flag is zero, $$Yi = Ym \times Mi/(2^7-1) = \frac{Ym}{2^7-1} \times Mi \quad (3)$$

if $f=1$, that is, if the value of the discrimination flag is one, $$Yi = Ym/(2^7-1)/(2^3-1) \times [(Mi\&(2^3-1)) \times Pi + \{(2^3-1)-(Mi\&(2^3-1))\} \times (Mi\&(2^7-2^3))] = \frac{Ym}{(2^7-1)}[(Mi\&(2^3-1)) \times Pi + \{(2^3-1) - (Mi\&(2^3-1))\} \times (Mi\&(2^7-2^3))]\frac{1}{(2^3-1)} \quad (4)$$

In the above expressions, Pi (Pr, Pg, Pb) is information on color components ($0 \leqq Pi \leqq 2^7-1$), and Ym is a maximum value of output data Yi from the conversion table.

When data in the image memory 11 as set by the equations (1) and (2,) are inputted into the conversion table as addresses, the equations (3) and (4) are expressed as follows.

From the equations (1) and (3), $$Yi = \frac{Ym}{2^7-1} \times int(Ci \times 2 + 0)/2 = \frac{Ym}{2^7-1} \times int(Ci+0) = \frac{Ym}{2^7-1} \times Ci \quad (5)$$

From the equations (2) and (4), because $$Mi = int[\{Ci\&(2^7-2^3)+k\} \times 2 + 1]/2 = int[\{Ci\&(2^7-2^3)+k\} + 1/2] = Ci\&(2^7-2^3)+k$$

the equation (4) will be:

$$Yi = \frac{Ym}{(2^7-1)}[k \times Pi + ((2^3-1)-k) \times .(Ci\&(2^7-2^3))]\frac{1}{(2^3-1)} = \frac{Ym}{(2^7-1)}\left[\frac{k}{(2^3-1)}Pi + \frac{(2^3-1)-k}{(2^3-1)}(Ci\&(2^7-2^3))\right] \quad (6)$$

As is understood from the above expression (5), the background is displayed based on only the color information Ci of the background. On the other hand, as is understood from the expression (6), color information Pi of each pixel of the characters is multiplied by a ratio of its own gray level k to the maximum value $(2^3-1)$ of the gray level. Further, color information Ci represented by the upper four bits, is multiplied by a ratio of the difference $\{(2^3-1)-k\}$ to the maximum value. As a result, the remaining part, other than the background (the character part), is displayed with mixed colors of the background and characters (whose colors are represented by Pi) in accordance with the gray level k of the character information. Specifically, when $k=2^3-1$, the characters' own colors are obtained; when $k=0$, colors belonging only to the background are obtained; and when $0<k<2^3-1$, mixed colors of the background and characters are obtained at mixture ratios based on the gray levels k.

According to the present invention, the color background information decreases (in the above example, the background information decreases by three bits) at the part underlying the border of the characters. It might be regarded as disadvantageous in obtaining a displayed image of a good quality. But, this does not present a problem for the following reasons. First, in the case of pixels constructing the main part of a character (the part other than its border) ($k=2^3-1$), the output from the look-up table memory 12 does not carry any color information of a color background and therefore the deterioration of image quality does not occur. Second, the part where the character overlaps with the background, which is the border part of the character, posses a very small area in an obtained image, and is of a neutral color. Therefore, the influence of the decrease in the bits in the color background information, on the image quality, is minimal.

Figure 5:
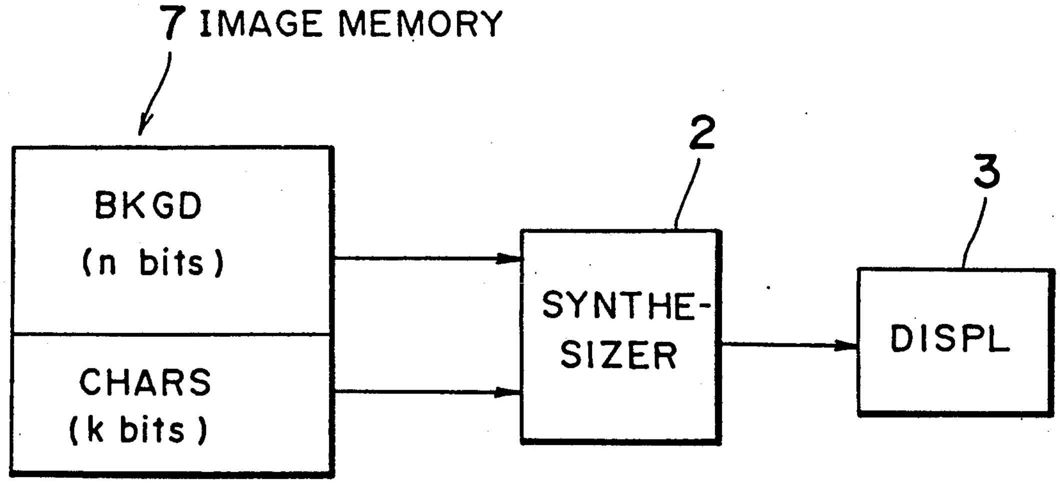
Fig. 5 PRIOR ART
Figure 4A:
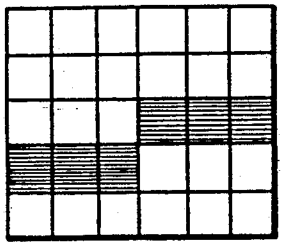
FIGS. 4(*a*) and (*b*) are illustrations for showing a difference in image quality between a binary image and an image having multiple gray levels.
Figure 4B:
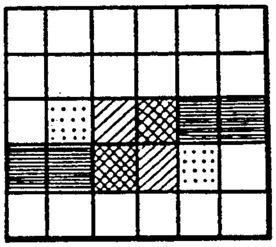

As is obvious from the above mentioned description, the image memory 11 does not have an increased capacity when compared with the conventional system of FIG. 3. Further, in spite of a small memory capacity, images of a good quality can be obtained similarly to the system of FIG. 5, which requires a large memory capacity. Therefore, this method of the present invention can be applied even an image device which has poor image to pixel decomposition.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for displaying an image, wherein the iamge is divided into a first iamge area including a character and a second image area including background, an image processing device for performing the method including a data setting device for setting image data corresponding to the character and the background, an image memory for storing the image data set by the setting device, a synthesizing device for synthesizing the image data of the character and the background, and a display unit for displaying the character synthesized with the background, comprising the steps of:

setting the image data corresponding to pixels of the image using a fixed number of bits in a first memory area of the image memory such that (a) when a flag is set to a first value and stored in a second memory area of the image memory, predetermined ones of the fixed number of bits are used to represent color information of the background and predetermined remaining ones of the fixed number of bits are used to represent grey scale values of the character, and (b) when the flag is set to a second value and stored in the second memory area of the image memory, all of the fixed number of bits are used to represent the color information of the background;

synthesizing color information of the character based on the color information of the background and the grey scale values of the character when the flag is set to the first value to thereby gradually deemphasize and blend the color information of the character into the color information of the background; and displaying the synthesized image on the display unit.

2. The method as claimed in claim 1, wherein the predetermining ones of the fixed number of bits used to represent the color information of the background in the first image area are upper bits and the predetermined remaining ones of the fixed number of bits used to represent the grey scale information of the character are lower bits of the fixed number of bits.

3. The method as claimed in claim 1, wherein the synthesizing device is a look-up table memory and data from the image memory are output to the look-up table memory as addresses.

4. The method as claimed in claim 1, wherein the character color information and background color information are mixed at ratios determined on the basis of the gray scale value of the pixels present in the first image area to thereby gradually deemphasize and blend the character into the background.

5. The method of claim 1, said synthesizing step including calculating the color information of each pixel of the character according to:

$$Ci = f(Ki, Kmax, P, B)$$

Ci = color information of each pixel of the character,
Ki = gray scale value for each pixel of the character,
Kmax = maximum gray scale value for each pixel of the character,
P = color information of a pixel at the center of the character,
B = color information of the background, and
f = a predetermined function.

6. The method of claim 5, said synthesizing step including calculating the color information of each pixel of the character according to:

$$C_i = \frac{K_i}{K_{max}} P + \frac{K_{max} - K_i}{K_{max}} B$$

P = color information of a pixel at the center of the character,
$C_1$ = color information of each pixel of the character,
$K_i$ = gray scale value for each pixel of the character,
$K_{max}$ = maximum gray scale value for each pixel of the character, and
B = color information of the background.

7. The method of claim 5, wherein $$Ci = \frac{g(Ki)}{g(K\max)} P + \frac{g(K\max) - g(Ki)}{g(K\max)} B$$

g = another predetermined function.

8. A method for displaying an image including characters, so as to blend character color information into background color information, comprising the steps of:

assigning a grey scale value to each pixel of an image corresponding to the character color information, wherein the grey scale value is decreased as character color information approaches the character border, so as to blend the character color information into the background color information;

storing the background color information, using predetermined ones of a fixed number of bits and using remaining ones of the fixed number of bits to represent the grey scale value of each pixel of the image corresponding to the character color information, when a flag is set to a first value;

storing the background color information, using all of the fixed number of bits when the flag is set to a second value;

synthesizing the background and character color information based on the grey scale values stored so as to successively deemphasize characters from character center to character border, to blend the character color information into the background color information; and displaying the synthesized information.

9. The method of claim 8, wherein the character color information and the background color information are mixed in ratios to thereby gradually deemphasize and blend the characters into the background.

10. The method of claim 9, wherein character center color information corresponds to a maximum grey scale value and the background color information corresponds to a minimum grey scale, with the remaining character color information corresponding to values therebetween.

11. The method of claim 8, said synthesizing step including calculating the color information of each pixel of the character according to:

$$Ci = f(Ki, Kmax, P, B)$$

Ci = color information of each pixel of the character,
Ki = gray scale value for each pixel of the character,
Kmax = maximum gray scale value for each pixel of the character,
P = color information of a pixel at the center of the character,
B = color information of the background, and
f = a predetermined function.

12. The method of claim 11, said synthesizing step including calculating the color information of each pixel of the character according to:

$$C_i = \frac{K_i}{K_{max}} P + \frac{K_{max} - K_i}{K_{max}} B$$

P = color information of a pixel at the center of the character,
$C_1$ = color information of each pixel of the character,
$K_i$ = gray scale value for each pixel of the character,
$K_{max}$ = maximum gray scale value for each pixel of the character, and
B = color information of the background.

13. The method of claim 11, wherein $$Ci = \frac{g(Ki)d}{g(K\max)} P + \frac{g(K\max) - g(Ki)}{g(K\max)} B$$

g = another predetermined function.

* * * * *